(12) United States Patent
Itakura

(10) Patent No.: US 11,222,641 B2
(45) Date of Patent: Jan. 11, 2022

(54) SPEAKER RECOGNITION DEVICE, SPEAKER RECOGNITION METHOD, AND RECORDING MEDIUM

(71) Applicant: Panasonic Intellectual Property Corporation of America, Torrance, CA (US)

(72) Inventor: Kousuke Itakura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 126 days.

(21) Appl. No.: 16/576,170

(22) Filed: Sep. 19, 2019

(65) Prior Publication Data

US 2020/0111496 A1 Apr. 9, 2020

Related U.S. Application Data

(60) Provisional application No. 62/741,712, filed on Oct. 5, 2018.

(30) Foreign Application Priority Data

Jun. 7, 2019 (JP) .............................. JP2019-107341

(51) Int. Cl.
  *G10L 17/06* (2013.01)
  *G06N 3/08* (2006.01)
  (Continued)

(52) U.S. Cl.
  CPC ................ *G10L 17/20* (2013.01); *G06N 3/04* (2013.01); *G06N 3/08* (2013.01); *G10L 17/00* (2013.01);
  (Continued)

(58) Field of Classification Search
  CPC .......... G06F 21/00; G06F 21/30; G06F 21/31; G06F 21/44; G06F 21/32; G06F 21/33;
  (Continued)

(56) References Cited

U.S. PATENT DOCUMENTS 6,298,323 B1 * 10/2001 Kaemmerer ............ G10L 17/06
  704/232
2014/0081640 A1 * 3/2014 Farrell .................... G10L 17/24
  704/249

(Continued)

OTHER PUBLICATIONS

Najim Dehak, et al., "Front-End Factor Analysis for Speaker Verification", IEEE Transactions On Audio, Speech, and Language Processing, vol. 19, No. 4, May 2011, pp. 788-798.

(Continued)

*Primary Examiner* — Linda Wong
(74) *Attorney, Agent, or Firm* — Wenderoth, Lind & Ponack, L.L.P.

(57) ABSTRACT

A speaker recognition device includes: a feature calculator that calculates two or more acoustic features of a voice of an utterance obtained; a similarity calculator that calculates two or more similarities, each being a similarity between one of one or more speaker-specific features of a target speaker for recognition and one of the two or more acoustic features; a combination unit that combines the two or more similarities to obtain a combined value; and a determiner that determines whether a speaker of the utterance is the target speaker based on the combined value. Here, (i) at least two of the two or more acoustic features have different properties, (ii) at least two of the two or more similarities have different properties, or (iii) at least two of the two or more acoustic features have different properties and at least two of the two or more similarities have different properties.

10 Claims, 14 Drawing Sheets

(51) Int. Cl.
*G10L 17/04* (2013.01)
*G06N 3/04* (2006.01)
*G10L 17/18* (2013.01)
*G10L 17/00* (2013.01)
*G10L 17/20* (2013.01)
*G10L 17/02* (2013.01)

(52) U.S. Cl.
CPC .............. *G10L 17/02* (2013.01); *G10L 17/04* (2013.01); *G10L 17/06* (2013.01); *G10L 17/18* (2013.01)

(58) Field of Classification Search
CPC ....... G06F 21/316; G10L 15/00; G10L 15/06; G10L 15/07; G10L 17/00; G10L 17/14; G10L 17/26
See application file for complete search history.

(56) References Cited

U.S. PATENT DOCUMENTS

2017/0076727 A1* 3/2017 Ding ................ G10L 17/00
2019/0228779 A1* 7/2019 Lesso ............... G10L 17/18

OTHER PUBLICATIONS

David Snyder, et al., "X-Vectors: Robust DNN Embeddings for Speaker Recognition", 2018 IEEE International Conference on Acoustics, Speech and Signal Processing (ICASSP), Apr. 2018.

* cited by examiner

FIG. 11A

| | TEST UTTERANCE | SECOND SIMILARITY (COSINE DISTANCE) | TARGET OR NONTARGET |
|---|---|---|---|
| 1 | VOICE FILE A | -0.081948216 | NONTARGET |
| 2 | VOICE FILE B | 0.158565866 | NONTARGET |
| 3 | VOICE FILE C | 0.147392892 | NONTARGET |
| 4 | VOICE FILE D | 0.108241222 | NONTARGET |
| 5 | VOICE FILE E | -0.098310312 | NONTARGET |
| 6 | VOICE FILE F | -0.114139308 | NONTARGET |
| 7 | VOICE FILE G | 0.199715385 | NONTARGET |
| 8 | VOICE FILE H | 0.103565826 | NONTARGET |
| 9 | VOICE FILE I | -0.087558949 | NONTARGET |
| 10 | VOICE FILE J | 0.019044818 | NONTARGET |
| 11 | VOICE FILE K | 0.105780289 | TARGET |
| 12 | VOICE FILE L | 0.008781824 | NONTARGET |
| 13 | VOICE FILE M | 0.084142563 | NONTARGET |

FIG. 11B

| | TEST UTTERANCE | FIRST SIMILARITY (COSINE DISTANCE) | TARGET OR NONTARGET |
|---|---|---|---|
| 1 | VOICE FILE A | 0.100540856 | NONTARGET |
| 2 | VOICE FILE B | -0.024522281 | NONTARGET |
| 3 | VOICE FILE C | 0.05118517 | NONTARGET |
| 4 | VOICE FILE D | 0.071511094 | NONTARGET |
| 5 | VOICE FILE E | 0.06812354 | NONTARGET |
| 6 | VOICE FILE F | 0.020803088 | NONTARGET |
| 7 | VOICE FILE G | 0.073818589 | NONTARGET |
| 8 | VOICE FILE H | 0.021315874 | NONTARGET |
| 9 | VOICE FILE I | -0.024530796 | NONTARGET |
| 10 | VOICE FILE J | 0.06866284 | NONTARGET |
| 11 | VOICE FILE K | 0.176004075 | TARGET |
| 12 | VOICE FILE L | 0.02962 | NONTARGET |
| 13 | VOICE FILE M | 0.004681845 | NONTARGET |

FIG. 11C

| | TEST UTTERANCE | FIRST SIMILARITY (PLDA) | TARGET OR NONTARGET |
|---|---|---|---|
| 1 | VOICE FILE A | 5.02305 | NONTARGET |
| 2 | VOICE FILE B | -18.8198 | NONTARGET |
| 3 | VOICE FILE C | -1.57693 | NONTARGET |
| 4 | VOICE FILE D | -3.77423 | NONTARGET |
| 5 | VOICE FILE E | -6.39639 | NONTARGET |
| 6 | VOICE FILE F | -18.0328 | NONTARGET |
| 7 | VOICE FILE G | -1.39406 | NONTARGET |
| 8 | VOICE FILE H | -3.62677 | NONTARGET |
| 9 | VOICE FILE I | -21.1234 | NONTARGET |
| 10 | VOICE FILE J | -2.60066 | NONTARGET |
| 11 | VOICE FILE K | 20.8134 | TARGET |
| 12 | VOICE FILE L | -3.32541 | NONTARGET |
| 13 | VOICE FILE M | 10.7584 | NONTARGET |

FIG. 12

| | TEST UTTERANCE | COMBINED VALUE | TARGET OR NONTARGET |
|---|---|---|---|
| 1 | VOICE FILE A | -0.293702025 | NONTARGET |
| 2 | VOICE FILE B | 0.559141687 | NONTARGET |
| 3 | VOICE FILE C | 1.153760425 | NONTARGET |
| 4 | VOICE FILE D | 0.891854103 | NONTARGET |
| 5 | VOICE FILE E | -0.795760107 | NONTARGET |
| 6 | VOICE FILE F | -1.363676253 | NONTARGET |
| 7 | VOICE FILE G | 1.667445162 | NONTARGET |
| 8 | VOICE FILE H | 0.637058329 | NONTARGET |
| 9 | VOICE FILE I | -1.417455819 | NONTARGET |
| 10 | VOICE FILE J | 0.203614756 | NONTARGET |
| 11 | VOICE FILE K | 1.830136345 | TARGET |
| 12 | VOICE FILE L | -0.063508225 | NONTARGET |
| 13 | VOICE FILE M | 0.702411294 | NONTARGET |

SPEAKER RECOGNITION DEVICE, SPEAKER RECOGNITION METHOD, AND RECORDING MEDIUM

CROSS REFERENCE TO RELATED APPLICATIONS

This application claims the benefit of priority of Japanese Patent Application Number 2019-107341 filed on Jun. 7, 2019, and U.S. Provisional Patent Application No. 62/741,712 filed on Oct. 5, 2018, the entire contents of which are hereby incorporated by reference.

BACKGROUND

1. Technical Field

The present disclosure relates to a speaker recognition device, a speaker recognition method, and a recoding medium.

2. Description of the Related Art

Speaker recognition technology is a technology for identifying whether an unknown speaker is a registered speaker on the basis of the similarity between a feature calculated from a previously collected voice uttered by the registered speaker and a newly obtained voice uttered by the unknown speaker.

For example, the following non-patent literature (NPTL) 1 discloses speaker-specific features, known as i-Vectors, that are highly accurate features used for speaker recognition, and a calculation method for the same: Dehak, Najim, et al. "Front-end factor analysis for speaker verification." Audio, Speech, and Language Processing, IEEE Transactions on 19.4 (2011): 788-798. The calculation of such features from the voice uttered by a registered speaker and the voice uttered by an unknown speaker enables highly accurate determination on whether the unknown speaker is the registered speaker.

SUMMARY

However, when the obtained voice uttered by the unknown speaker includes noise or other component, the use of features calculated by the calculation method disclosed in NPTL 1 in speaker recognition sometimes results in false recognition that the utterance actually spoken by the unknown speaker is the utterance by the registered speaker. Stated differently, the conventional technology has a problem in that the accuracy of speaker recognition is reduced when a newly obtained voice uttered by the unknown speaker includes noise or other component.

The present disclosure has been conceived in view of the above circumstances, and its object is to provide a speaker recognition device, a speaker recognition method, and a recording medium that enhance the accuracy of speaker recognition even in an environment with noise intrusion.

The speaker recognition device according to one aspect of the present disclosure includes: a feature calculator that calculates two or more acoustic features of a voice of an utterance obtained; a similarity calculator that calculates two or more similarities, each being a similarity between one of one or more speaker-specific features of a target speaker for recognition and one of the two or more acoustic features calculated by the feature calculator; a combination unit that combines the two or more similarities calculated by the similarity calculator to obtain a combined value; and a determiner that determines whether a speaker of the utterance is the target speaker for recognition based on the combined value obtained by the combination unit. Here, (i) at least two of the two or more acoustic features have different properties, (ii) at least two of the two or more similarities have different properties, or (iii) at least two of the two or more acoustic features have different properties and at least two of the two or more similarities have different properties.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The speaker recognition device and so forth according to the present disclosure enhance the accuracy of speaker recognition even in an environment with noise intrusion.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 11A is a diagram showing exemplary similarities calculated by a similarity calculator shown in FIG. 10;

FIG. 11B is a diagram showing exemplary similarities calculated by the similarity calculator shown in FIG. 10;

FIG. 11C is a diagram showing exemplary similarities calculated by the similarity calculator shown in FIG. 10; and FIG. 12 is a diagram showing exemplary combined values calculated by a combination unit shown in FIG. 10.

DETAILED DESCRIPTION OF THE EMBODIMENT

Figure 1:
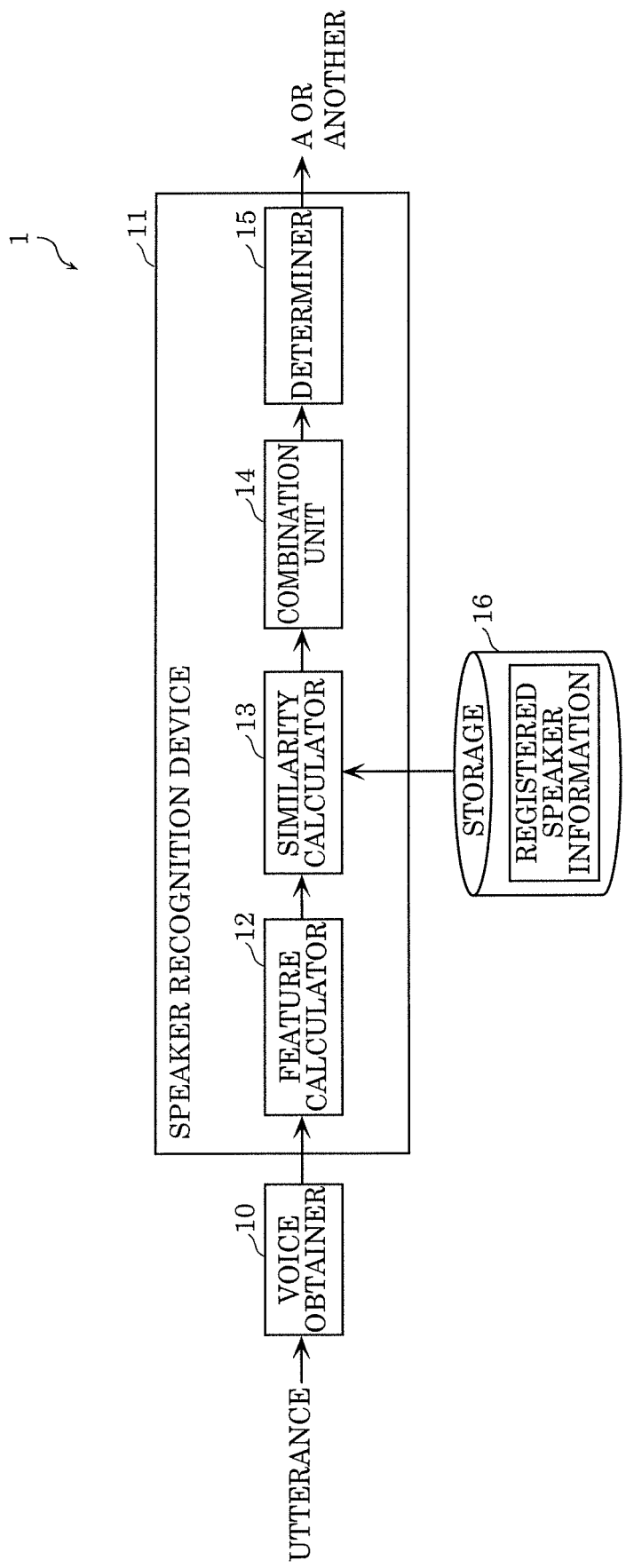
FIG. 1 is an exemplary block diagram of the configuration of a speaker recognition system according to an embodiment of the present disclosure.

The speaker recognition device according to one aspect of the present disclosure includes: a feature calculator that calculates two or more acoustic features of a voice of an utterance obtained; a similarity calculator that calculates two or more similarities, each being a similarity between one of one or more speaker-specific features of a target speaker for recognition and one of the two or more acoustic features calculated by the feature calculator; a combination unit that combines the two or more similarities calculated by the similarity calculator to obtain a combined value; and a determiner that determines whether a speaker of the utterance is the target speaker for recognition based on the combined value obtained by the combination unit. Here, (i) at least two of the two or more acoustic features have different properties, (ii) at least two of the two or more similarities have different properties, or (iii) at least two of the two or more acoustic features have different properties and at least two of the two or more similarities have different properties.

According to this aspect, two or more similarities between the current speaker and the registered speaker calculated from at least two acoustic features having different properties or two or more similarities having different properties are combined to determine whether such speaker matches the registered speaker. This configuration achieves a more accurate determination on whether such speaker matches the registered speaker by use of the combined similarity, even when acoustic features cannot be correctly calculated due to noise intrusion. The present aspect thus enhances the accuracy of speaker recognition even in an environment with noise intrusion.

For example, the at least two of the two or more similarities may be a first similarity and a second similarity having different properties, and the first similarity may be calculated from a first acoustic feature by probabilistic linear discriminant analysis by use of a trained calculation model that has been trained with a feature of the target speaker including how the target speaker speaks and that is used to calculate a first speaker-specific feature that is one of the one or more speaker-specific features. Here, the first acoustic feature is one of the two or more acoustic features calculated by the feature calculator. Also, the second similarity may be calculated as a cosine distance between a second speaker-specific feature that is one of the one or more speaker-specific features and a second acoustic feature that is one of the two or more acoustic features calculated by the feature calculator.

Also, for example, the at least two of the two or more acoustic features may be a first acoustic feature and a second acoustic feature having different properties, the first acoustic feature may be calculated by the feature calculator by applying linear transformation on a physical quantity of the voice of the utterance by use of an i-Vector, and the second acoustic feature may be calculated by the feature calculator by applying non-linear transformation on the physical quantity of the voice by use of a deep neural network (DNN).

Also, for example, the at least two of the two or more acoustic features may be a first acoustic feature and a second acoustic feature having different properties, the first acoustic feature may be calculated by the feature calculator by applying non-linear transformation by use of a first model of a DNN, the second acoustic feature may be calculated by the feature calculator by applying non-linear transformation by use of a second model of the DNN that is different in property from the first model, the first model may be a model trained with first training data that includes a voice of the target speaker for recognition in a noise environment at or higher than a threshold level, and the second model may be a model trained with second training data that includes a voice of the target speaker for recognition in a noise environment below the threshold level.

Also, for example, the first acoustic feature and the second acoustic feature may be identical.

Also, for example, the combination unit may combine the two or more similarities by adding scores representing the two or more similarities calculated by the similarity calculator.

Also, for example, the combination unit may combine the two or more similarities calculated by the similarity calculator by normalizing the two or more similarities to cause a mean value to be zero and a variance to be one, and adding the two or more similarities having been normalized.

Also, for example, the combination unit may combine the two or more similarities calculated by the similarity calculator by normalizing the two or more similarities to cause a mean value to be zero and a variance to be one, and calculating a weighted sum of the two or more similarities having been normalized.

Also, for example, the combination unit may calculate the weighted sum by multiplying by a greater coefficient as a temporal length of the utterance obtained is longer.

The speaker recognition method according to another aspect of the present disclosure is a speaker recognition method performed by a computer. Such speaker recognition method includes: calculating two or more acoustic features of a voice of an utterance obtained; calculating two or more similarities, each being a similarity between one of one or more speaker-specific features of a target speaker for recognition and one of the two or more acoustic features calculated in the calculating of the two or more acoustic features; combining the two or more similarities calculated in the calculating of the two or more similarities to obtain a combined value; and determining whether a speaker of the utterance is the target speaker for recognition based on the combined value obtained in the combining. Here, (i) at least two of the two or more acoustic features have different properties, (ii) at least two of the two or more similarities have different properties, or (iii) at least two of the two or more acoustic features have different properties and at least two of the two or more similarities have different properties.

The recording medium according to further another aspect of the present disclosure is a recording medium having a computer program recorded thereon for causing the computer to execute: calculating two or more acoustic features of a voice of an utterance obtained; calculating two or more similarities, each being a similarity between one of one or more speaker-specific features of a target speaker for recognition and one of the two or more acoustic features calculated in the calculating of the two or more acoustic features; combining the two or more similarities calculated in the calculating of the two or more similarities to obtain a combined value; and determining whether a speaker of the utterance is the target speaker for recognition based on the combined value obtained in the combining. Here, (i) at least two of the two or more acoustic features have different properties, (ii) at least two of the two or more similarities have different properties, or (iii) at least two of the two or more acoustic features have different properties and at least two of the two or more similarities have different properties.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes an embodiment according to the present disclosure with reference to the drawings. Note that the following embodiment shows a comprehensive or specific illustration of the present disclosure. The numerical values, shapes, structural components, steps, the processing order of the steps, etc. shown in the following embodiment are mere examples, and thus are not intended to limit the present disclosure. Of the structural components described in the following embodiment, structural components not recited in any one of the independent claims that indicate the broadest concepts of the present disclosure will be described as optional structural components. Also note that the descriptions in the following embodiment, variations, etc. may be combined.

EMBODIMENT

The following describes a speaker recognition method and so forth according to the present embodiment with reference to the drawings.

[Speaker Recognition System 1]

FIG. 1 is a block diagram of an exemplary configuration of speaker recognition system 1 according to the present embodiment.

Speaker recognition system 1 according to the present embodiment is utilized for verification of a speaker (e.g., Ms. A), and finds its application in, for example, an entry and exit control system, a security system, and so forth.

As shown in FIG. 1, speaker recognition system 1 includes voice obtainer 10, speaker recognition device 11, and storage 16.

[Voice Obtainer 10]

Figure 2:
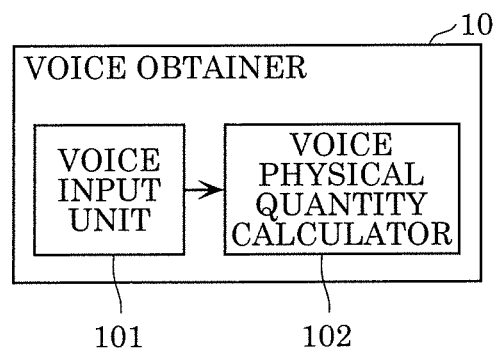
FIG. 2 is an exemplary block diagram of a concrete configuration of a voice obtainer shown in FIG. 1.

FIG. 2 is an exemplary block diagram of a concrete configuration of the voice obtainer shown in FIG. 1.

As shown in FIG. 2, voice obtainer 10 includes voice input unit 101 and voice physical quantity calculator 102.

Voice input unit 101 includes, for example, a microphone, and accepts an input of a voice uttered by a speaker. Voice input unit 101 converts the input voice into a voice signal, and outputs the voice signal to voice physical quantity calculator 102.

Voice physical quantity calculator 102 calculates the physical quantity of the uttered voice from the voice signal of the utterance. Voice physical quantity calculator 102 according to the present embodiment calculates, from the voice signal of the utterance, a Mel-Frequency Cepstrum Coefficient (MFCC), which is a voice feature. An MFCC is a feature representing the characteristics of the vocal tract of a speaker. Note that voice physical quantity calculator 102 may calculate not only an MFCC as the physical quantity of an uttered voice, but calculate the resultant of applying the mel-filterbank to the voice signal of the utterance or a spectrogram of the voice signal of the utterance. Voice physical quantity calculator 102 may also use a Deep Neural Network (DNN) to calculate, from the voice signal of the utterance, a voice feature as the physical quantity of the uttered voice.

[Speaker Recognition Device 11]

Figure 3:
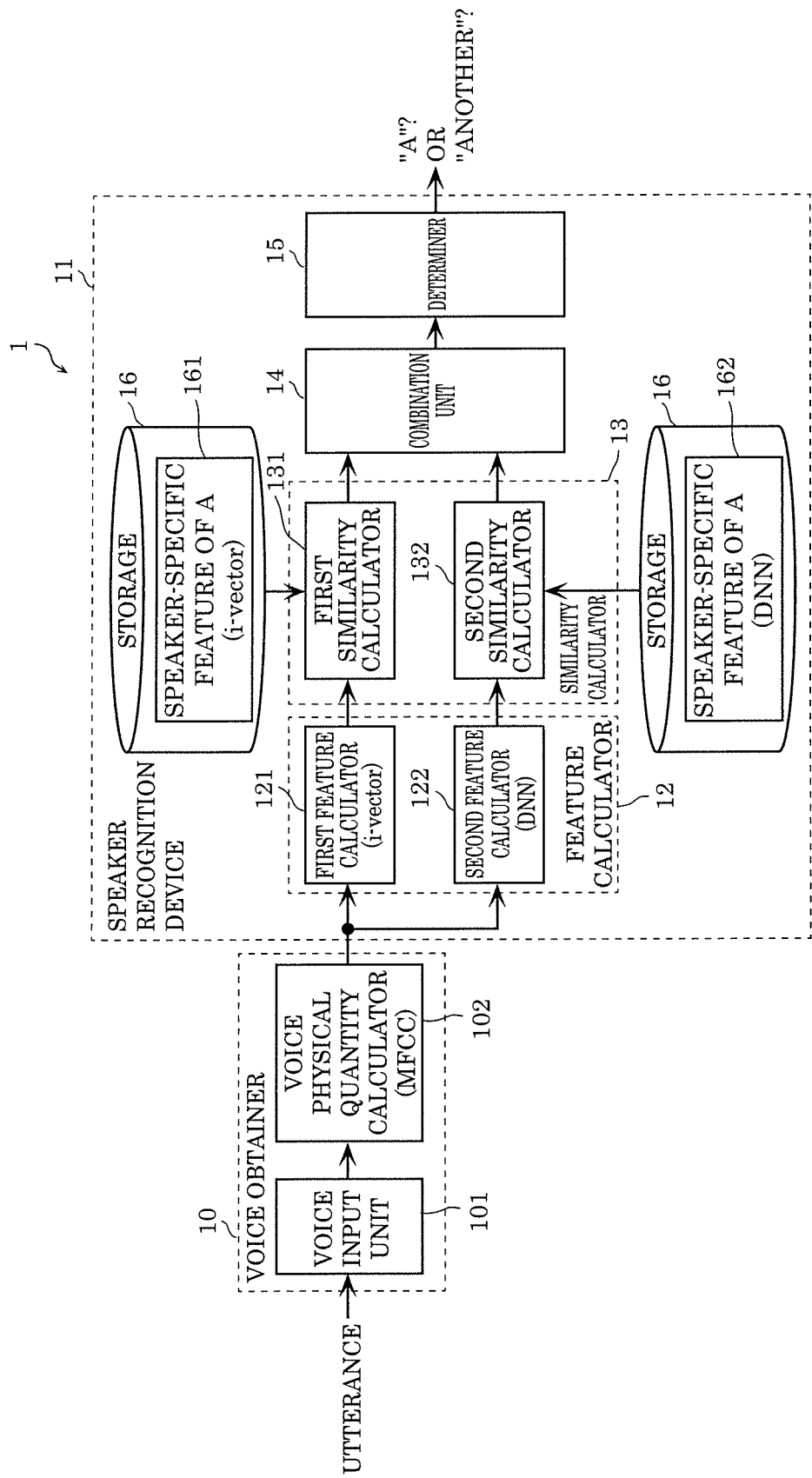
FIG. 3 is an exemplary block diagram of a concrete configuration of a speaker recognition device according to an embodiment of the present disclosure.

FIG. 3 is an exemplary block diagram of a concrete configuration of the speaker recognition device according to the present embodiment.

Speaker recognition device 11 is implemented, for example, as a computer that includes a processor (microprocessor), a memory, a communication interface, and so forth. Speaker recognition device 11 may operate as part of a server, or one or more structural components of speaker recognition device 11 may operate as part of a cloud server. Speaker recognition device 11 performs a process of recognizing whether a speaker matches the target registered speaker for recognition.

As shown in FIG. 1, speaker recognition device 11 includes feature calculator 12, similarity calculator 13, combination unit 14, and determiner 15. Note that speaker recognition device 11 may further include storage 16 as an optional structural component.

[Feature Calculator 12]

Feature calculator 12 calculates two or more acoustic features of the voice of the obtained utterance. More specifically, feature calculator 12 transforms the physical quantity of the uttered voice into two or more speaker-specific features, thereby calculating two or more acoustic features. At least two acoustic features among the two or more acoustic features may have different properties.

As shown in FIG. 3, feature calculator 12 according to the present embodiment includes first feature calculator 121 and second feature calculator 122 to transform the physical quantity of the uttered voice inputted from voice obtainer 10 into two speaker-specific features, thereby calculating two acoustic features having different properties. The following describes such two acoustic features as a first acoustic feature and a second acoustic feature.

<First Feature Calculator 121>

First feature calculator 121 applies, using an i-Vector, linear transformation on the physical quantity of the uttered voice inputted from voice obtainer 10 to obtain a speaker-specific feature. Through this process, first feature calculator 121 calculates the first acoustic feature.

Here, the i-Vector-based method is a statistical technique that uses a Gaussian distribution mixture model to extract a speaker-specific feature, which is a feature unique to a speaker, as an acoustic feature of an utterance, on the basis of statistical features of utterances. The i-Vector-based method achieves a more accurate statistical value as an utterance is longer, and thus is advantageous in that a speaker-specific feature having a higher property is obtainable as the utterance is longer. The details of this calculation method is disclosed in NPTL 1, and thus will not be described in detail here.

<Second Feature Calculator 122>

Second feature calculator 122 applies, using a DNN, non-linear transformation on the physical quantity of the uttered voice inputted from voice obtainer 10 to obtain a speaker-specific feature. Through this process, second feature calculator 122 calculates the second acoustic feature that is different in properties from the first acoustic feature.

Here, the DNN-based method is a technique that inputs the physical quantity of an uttered voice to a DNN that includes a feature extraction unit and an identification unit having been trained, thereby outputting an acoustic feature, i.e., a speaker-specific feature, of the utterance obtained by mapping a variable-length utterance on a fixed-dimensional embedding. Such technique that maps a variable-length utterance on a fixed-dimensional embedding to calculate a speaker-specific feature is known as x-Vector. Stated differently, first feature calculator 121 uses a DNN to calculate, from the physical quantity of an uttered voice, the first acoustic feature, which is a feature unique to a speaker known as an x-Vector. The x-Vector-based method is advantageous in that a speaker-specific feature that is less prone to property degradation is obtainable, depending on a model to be prepared, even when an utterance is short. The details of the calculation method and so forth of x-Vectors are disclosed in the following non-patent literature, and thus will not be described in detail here: David, Snyder, et al. "X-VECTORS: ROBUST DNN EMBEDDINGS FOR SPEAKER RECOGNITION." Center for Language and Speech Processing & Human Language Technology Center of Excellence, The Johns Hopkins University, Baltimore, Md. 21218, USA.

[Similarity Calculator 13]

Similarity calculator 13 calculates the similarity between each of one or more speaker-specific features of the target speaker for recognition and each of the two or more acoustic features calculated by feature calculator 12.

As shown in FIG. 3, similarity calculator 13 according to the present embodiment includes first similarity calculator 131 and second similarity calculator 132.

<First Similarity Calculator 131>

First similarity calculator 131 calculates the similarity between the first acoustic feature calculated by first feature calculator 121 and speaker-specific feature 161 of the target speaker for recognition stored in storage 16. Here, speaker-specific feature 161 is a previously stored speaker-specific feature. More specifically, speaker-specific feature 161 is obtained by applying, by use of an i-Vector, linear transformation on a previously collected physical quantity of the voice of the target speaker for recognition. Speaker-specific feature 161 shown in an example of FIG. 3 is a speaker-specific feature of Ms. A, being the target speaker for recognition.

First similarity calculator 131 according to the present embodiment calculates a cosine by use of an inner product in a vector space model, thereby calculating, as a first similarity, a cosine distance (also referred to as cosine similarity) that represents the inter-vector angle between the first acoustic feature and speaker-specific feature 161. In this case, the degree of similarity is lower as the value of the inter-vector angle is greater. Note that first similarity calculator 131 may calculate, as the first similarity, a cosine distance in a value range from −1 to 1 by use of the inner product of the vector representing the first acoustic feature and the vector representing speaker-specific feature 161. In this case, the degree of similarity is higher as the value of the cosine distance is greater.

<Second Similarity Calculator 132>

Second similarity calculator 132 calculates the similarity between the second acoustic feature calculated by second feature calculator 122 and speaker-specific feature 162 of the target speaker for recognition stored in storage 16. Here, speaker-specific feature 162 is a previously stored speaker-specific feature. More specifically, speaker-specific feature 162 is obtained by applying, by use of a DNN, non-linear transformation on a previously collected physical quantity of the voice of the target speaker for recognition. Speaker-specific feature 162 shown in an example of FIG. 3 is a speaker-specific feature of Ms. A, being the target speaker for recognition.

Second similarity calculator 132 according to the present embodiment calculates a cosine by use of an inner product in a vector space model, thereby calculating, as a second similarity, a cosine distance that represents the inter-vector angle between the second acoustic feature and speaker-specific feature 162. Note that second similarity calculator 132 may calculate, as the second similarity, a cosine distance in a value range from −1 to 1 by use of the inner product of the vector representing the second acoustic feature and the vector representing speaker-specific feature 162.

In the present embodiment, as described above, the first similarity calculated by first similarity calculator 131 and the second similarity calculated by second similarity calculator 132 may be calculated by the same method.

[Combination Unit 14]

Combination unit 14 combines two or more similarities calculated by similarity calculator 13. In so doing, combination unit 14 may add scores indicating the respective similarities calculated by similarity calculator 13, thereby combining two or more similarities. Alternatively, combination unit 14 may normalize the similarities calculated by similarity calculator 13 so that the mean value is zero and the variance is one and add the normalized similarities, thereby combining two or more similarities.

Note that combination unit 14 may normalize the similarities calculated by similarity calculator 13 so that the mean value is zero and the variance is one to calculate a weighted sum, thereby combining two or more similarities. In so doing, combination unit 14 multiplies by a larger coefficient to calculate a weighted sum as the temporal length of an obtained utterance is longer.

Combination unit 14 according to the present embodiment performs an addition of the first similarity calculated by first similarity calculator 131 and second similarity calculated by second similarity calculator 132. Stated differently, combination unit 14 adds up the first similarity and the second similarity, thereby combining the first similarity and the second similarity. For example, combination unit 14 may add the inter-vector angle that is a score indicating the first similarity and the inter-vector angle that is a score indicating the second similarity to calculate a combined value.

Note that the first similarity is calculated, as the first acoustic feature, from a speaker-specific feature that is higher in property as an utterance is longer, and the second similarity is calculated, as the second acoustic feature, from a speaker-specific feature that is less prone to property degradation even when an utterance is short. In this case, combination unit 14 may normalize the inter-vector angle that is a score indicating the first similarity and the inter-vector angle that is a score indicating the second similarity so that the mean value is zero and the variance is one to calculate a weighted sum, thereby calculating a combined value, which a combined first similarity and second similarity. A larger coefficient is simply multiplied to calculate a weighted sum as the temporal length of the utterance is longer.

[Determiner 15]

Determiner 15 determines whether the current speaker is the target speaker for recognition on the basis of the combined value obtained by combination unit 14.

Determiner 15 according to the present embodiment determines whether the current speaker is the target speaker for recognition by use of the combined value obtained by combination unit 14, i.e., the added value obtained by adding the score indicating the first similarity and the score indicating the second similarity. In an example shown in FIG. 3, determiner 15 determines whether the current speaker is Ms. A, using as the combined value the added value obtained by combination unit 14.

Figure 4A:
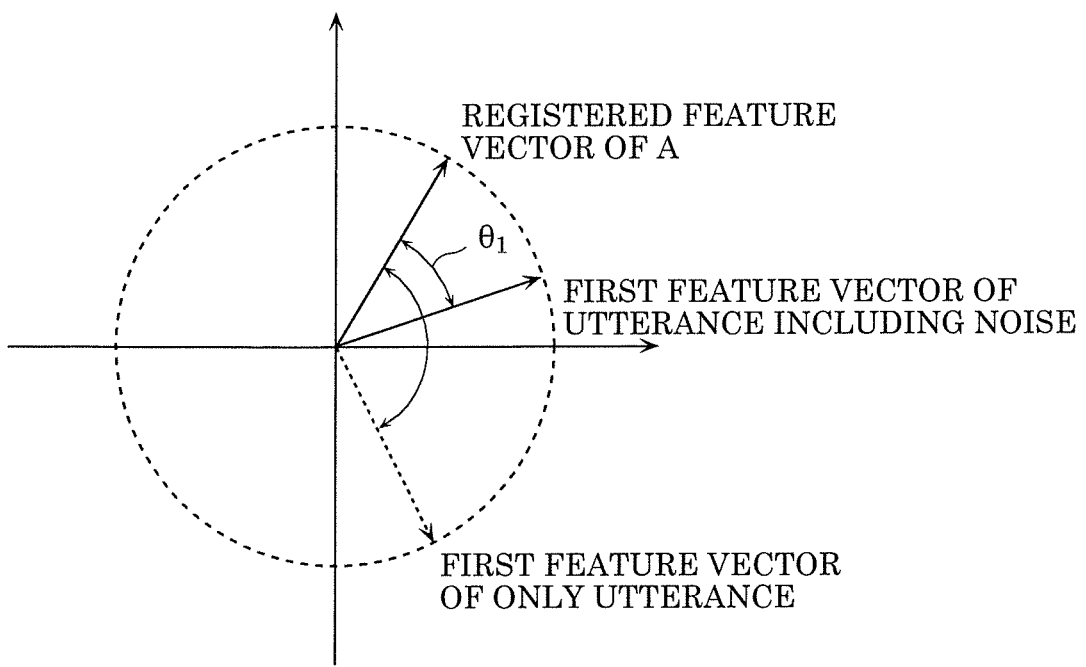
FIG. 4A is a diagram showing an example of a first similarity calculated by a first similarity calculator of the speaker recognition device shown in FIG. 3.
Figure 4B:
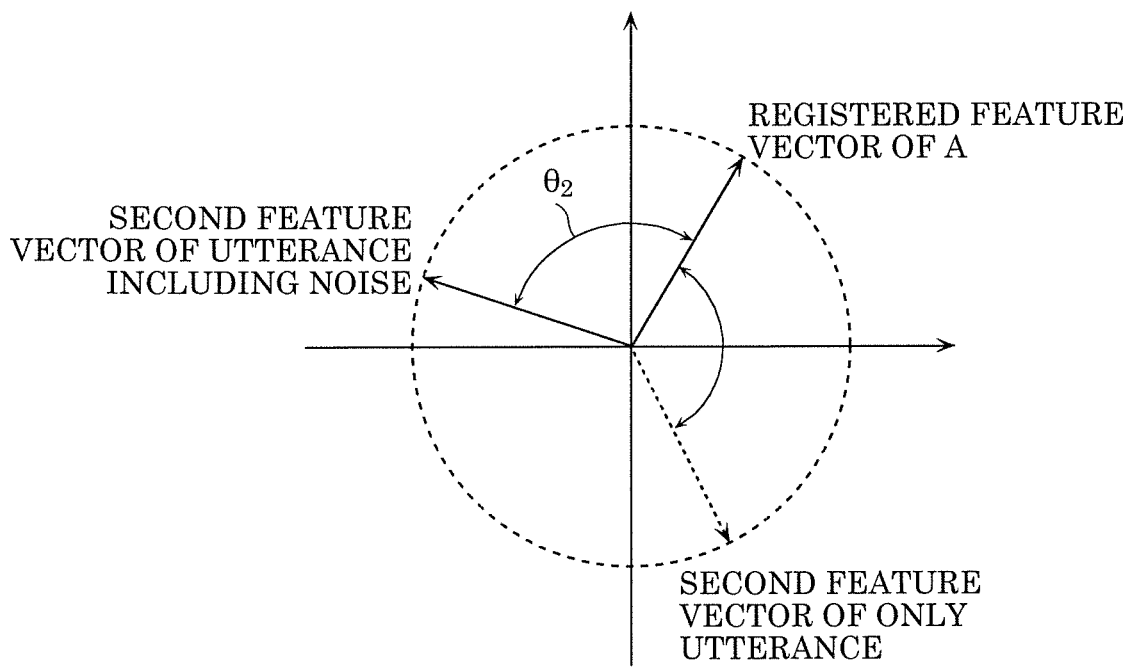
FIG. 4B is a diagram showing an example of a second similarity calculated by a second similarity calculator of the speaker recognition device shown in FIG. 3.

Here, with reference to FIG. 4A and FIG. 4B, an exemplary method is described of determining that the current speaker is not the target speaker for recognition by use of a combined value, when the current speaker is not the target speaker for recognition and the utterance obtained by voice obtainer 10 includes noise or a component other than that of the utterance.

FIG. 4A is a diagram showing an example of the first similarity calculated by first similarity calculator 131 of speaker recognition device 11 shown in FIG. 3. FIG. 4A shows a first feature vector of an utterance that includes noise, which is a vector representing the first feature calculated by first feature calculator 121 when such utterance obtained by voice obtainer 10 includes noise or a component other than that of the utterance. FIG. 4A also shows for reference a registered feature vector, which is a vector representing a speaker-specific feature of Ms. A, being the target speaker for recognition, stored in storage 16. FIG. 4A further shows for reference a first feature vector of only an utterance, which is a vector representing the first feature calculated by first feature calculator 121 when such utterance obtained by voice obtainer 10 includes no noise or component other than that of the utterance.

FIG. 4B is a diagram showing an example of the second similarity calculated by second similarity calculator 132 of speaker recognition device 11 shown in FIG. 3. Similar to FIG. 4A, FIG. 4B shows a second feature vector of an utterance that includes noise, which is a vector representing the second feature calculated by second feature calculator 122 when such utterance obtained by voice obtainer 10 includes noise or a component other than that of the utterance. FIG. 4B also shows for reference a registered feature vector, which is a vector representing a speaker-specific feature of Ms. A, being the target speaker for recognition, stored in storage 16. FIG. 4B further shows for reference a second feature vector of only an utterance, which is a vector representing the second feature calculated by second feature calculator 122 when such utterance obtained by voice obtainer 10 includes no noise or component other than that of the utterance.

As shown in FIG. 4A, the similarity between the first feature of the utterance that includes noise and the speaker-specific feature of Ms. A is represented by $\theta_1$, which is the inter-vector angle between the first feature vector of the utterance that includes noise and the registered feature vector. Such inter-vector angle $\theta_1$ is, for example, 30°. Meanwhile, as shown in FIG. 4B, the similarity between the second feature of the utterance that includes noise and the speaker-specific feature of Ms. A is represented by $\theta_2$, which is the inter-vector angle between the second feature vector of the utterance that includes noise and the registered feature vector. Such inter-vector angle $\theta_2$ is, for example, 90°.

In this case, the combined value of the similarities calculated by combination unit 14 is 120°, which is obtained by adding 30° and 90°. The combined value obtained by combination unit 14 indicates a large angle, and thus determiner 15 determines that the current speaker is not Ms. A, that is, not the target speaker for recognition.

When the current speaker is the target speaker for recognition, both of the following inter-vector angles are likely to be small: the inter-vector angle between the first feature vector of the utterance that includes noise and the registered feature vector; and the inter-vector angle between the second feature vector of the utterance that includes noise and the registered feature vector. Since the angle represented by the combined value obtained by combination unit 14 is also likely to be small, determiner 15 can easily determine, from the combined value obtained by combination unit 14, that the current speaker and Ms. A is the same speaker, that is, the current speaker is the target speaker for recognition.

Meanwhile, when the current speaker is not the target speaker for recognition, and one of the following inter-vector angles becomes a small value, the possibility is low of the other inter-vector angle becoming a small value: the inter-vector angle between the first feature vector of the utterance that includes noise and the registered feature vector; and the inter-vector angle between the second feature vector of the utterance that includes noise and the registered feature vector. Since the combined value obtained by combination unit 14 is less likely to be small, determiner 15 can easily determine that the current speaker is not the target speaker for recognition from the combined value obtained by combination unit 14.

[Storage 16]

Storage 16 includes, for example, a rewritable non-volatile memory such as a hard disk drive and a solid-state drive, and stores speaker-specific features that are features unique to the registered target speaker for recognition. As shown in FIG. 3, storage 16 according to the present embodiment stores speaker-specific feature 161 of Ms. A and speaker-specific feature 162 of Ms. A. Speaker-specific feature 161 is, as described above, a speaker-specific feature obtained by applying, by use of an i-Vector, linear transformation on the previously collected physical quantity of the voice of the target speaker for recognition. Speaker-specific feature 162 is a speaker-specific feature obtained by applying, by use of a DNN, non-linear transformation on the previously collected physical quantity of the voice of the target speaker for recognition.

[Operation of Speaker Recognition Device 11]

The following describes the operation of speaker recognition device 11 with the above configuration.

Figure 5:
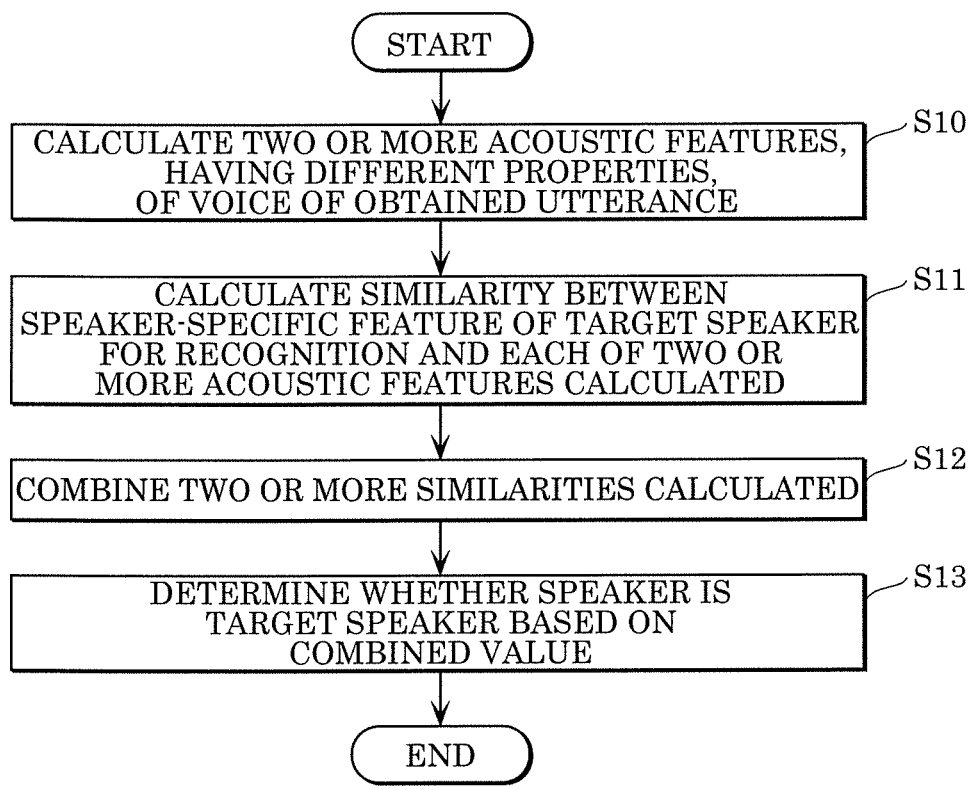
FIG. 5 is a flowchart of an outlined operation of the speaker recognition device according to an embodiment of the present disclosure.

FIG. 5 is a flowchart of an outlined operation of speaker recognition device 11 according to the present embodiment.

First, speaker recognition device 11 calculates two or more acoustic features of the uttered voice obtained by voice obtainer 10 (S10). Next, speaker recognition device 11 calculates the similarity between each of one or more speaker-specific features of the target speaker for recognition and each of the two or more acoustic features calculated in step S10 (S11). Speaker recognition device 11 then combines two or more similarities calculated in step S11 (S12). Subsequently, speaker recognition device 11 determines whether the speaker of the utterance obtained by voice obtainer 10 is the target speaker for recognition on the basis of the combined value obtained by combining two or more similarities in step S12 (S13).

[Effect, Etc.]

As described above, the present embodiment achieves speaker recognition device 11 that enhances the accuracy of speaker recognition even in an environment with noise intrusion.

The following describes an effect achieved by speaker recognition device 11 according to the present embodiment by use of a comparative example.

Figure 6:
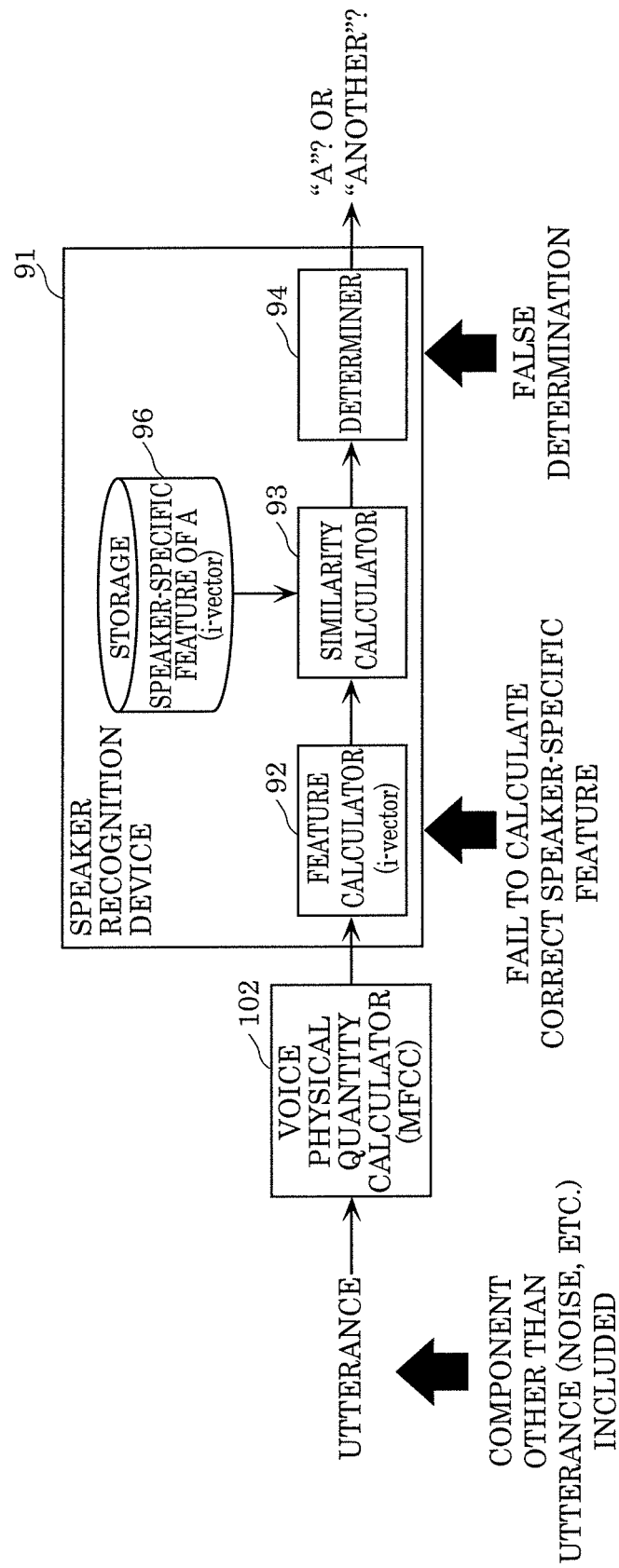
FIG. 6 is a block diagram of the configuration of a speaker recognition system according to a comparative example of the present disclosure.

FIG. 6 is a block diagram of the configuration of speaker recognition device 91 according to a comparative example.

The structural components that are analogous to those in FIG. 1 and FIG. 2 are assigned with the same reference numbers, and will not be described in detail here.

Speaker recognition device 91 according to the comparative example includes feature calculator 92, similarity calculator 93, determiner 94, and storage 96.

Feature calculator 92 applies, by use of an i-Vector, linear transformation on the physical quantity of the uttered voice obtained from voice physical quantity calculator 102 to obtain a speaker-specific feature, thereby calculating a feature of the obtained utterance (a first feature). Note that feature calculator 92 corresponds to a structural component analogous to first feature calculator 121.

Similarity calculator 93 calculates the similarity between the feature calculated by feature calculator 92 (the first feature) and the speaker-specific feature of Ms. A, being the target speaker for recognition, stored in storage 96. In an example shown in FIG. 6, similarity calculator 93 calculates, as the similarly, a cosine distance representing the inter-vector angle between the feature calculated by feature calculator 92 and the speaker-specific feature of Ms. A stored in storage 96. Note that similarity calculator 93 corresponds to a structural component analogous to first similarity calculator 131.

Determiner 94 determines whether the current speaker is the target speaker for recognition on the basis of the similarity calculated by similarity calculator 93.

Here, the current speaker is not Ms. A, that is, not the target speaker for recognition, and the obtained utterance includes noise or a component other than that of the utterance. In this case, as shown in FIG. 4A, the similarity between the first feature of the utterance that includes noise and the speaker-specific feature of Ms. A is represented by $\theta_1$, which is the inter-vector angle between the first feature vector of the utterance that includes noise and the registered feature vector. Such inter-vector angle $\theta_1$ is, for example, 30°. The inter-vector angle $\theta_1$ between the first feature vector of the utterance that includes noise and the registered feature vector is small, and thus determiner 94 falsely determines that the current speaker is Ms. A being the target speaker for recognition.

Stated differently, as shown in FIG. 4A, when the obtained utterance includes no noise or component other than that of the utterance, the inter-vector angle between the feature vector of only the utterance and the registered feature vector of Ms. A is large, and thus determiner 94 can correctly determine that the current speaker is not Ms. A being the target speaker for recognition. When the obtained utterance includes noise or a component other than that of the utterance, however, feature calculator 92 fails to calculate a correct speaker-specific feature, and thus determiner 94 makes a false determination on the basis of the first feature of the utterance that includes noise (the first feature vector of the utterance that includes noise), which is an incorrect speaker-specific feature.

Speaker recognition device 11 according to the present embodiment, as described above, combines two or more similarities between the current speaker and the registered speaker calculated from at least two acoustic features having different properties to determine whether the current speaker matches the registered speaker. This configuration achieves a more accurate determination on whether the current speaker matches the registered speaker by use of the combined similarities, even when acoustic features cannot be correctly calculated due to noise intrusion.

Speaker recognition device 11 according to the present embodiment thus enhances the accuracy of speaker recognition even in an environment with noise intrusion.

Variation 1

The foregoing embodiment has described the case in which linear transformation and non-linear transformation are applied on the physical quantity of the uttered voice to obtain speaker-specific features, thereby obtaining at least two acoustic features having different properties and combining two or more similarities, between the current speaker and the registered speaker, calculated from such acoustic features. The present disclosure, however, is not limited to this example. The same effect is achieved by calculating speaker-specific features from the physical quantity of the uttered voice by use of at least two models that have been trained with different pieces of training data to obtain at least two acoustic features having different properties. The following describes such case as Variation 1, focusing on the differences from the foregoing embodiment.

[Speaker Recognition Device 11A]

Figure 7:
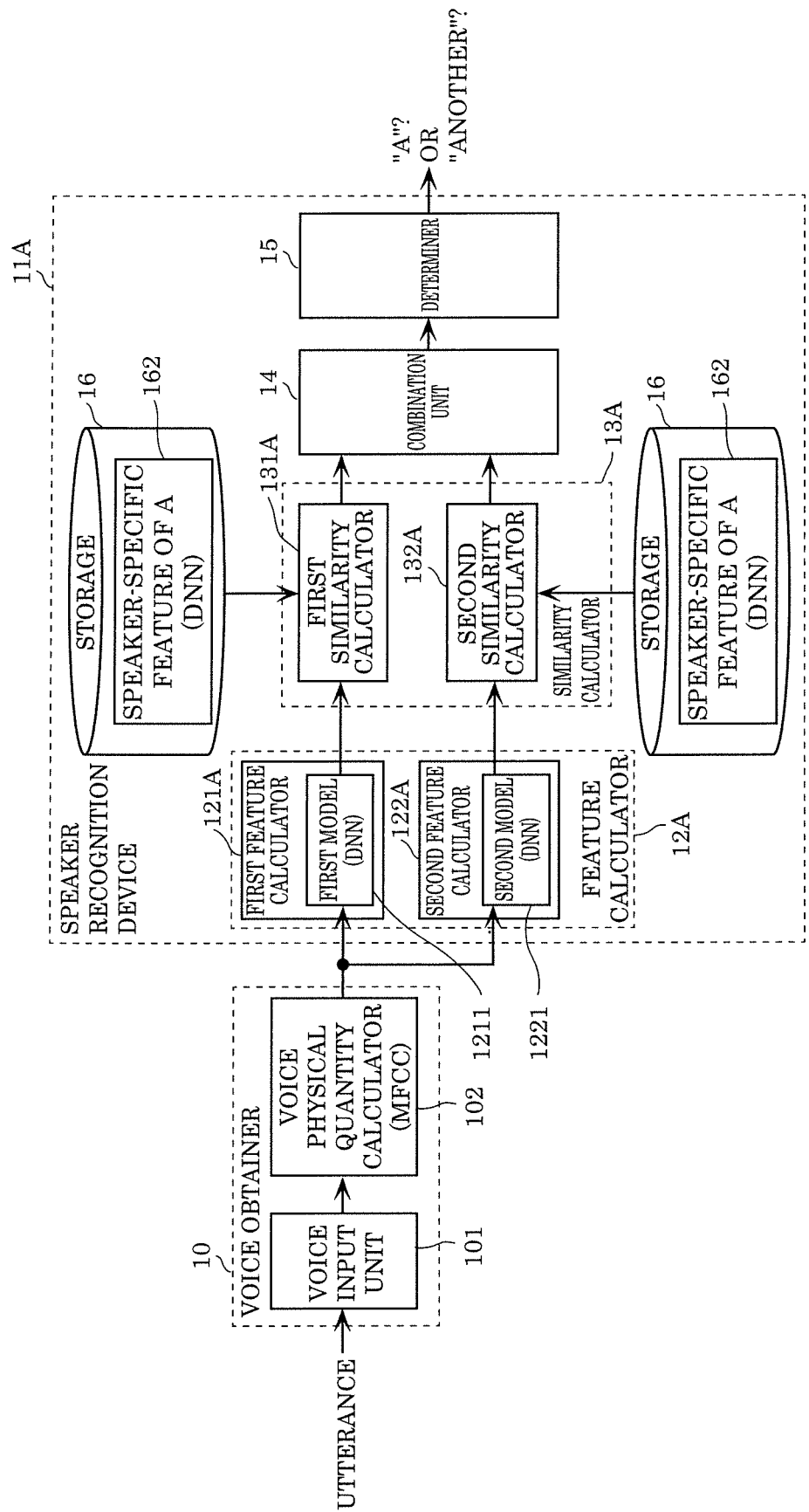
FIG. 7 is an exemplary block diagram of a concrete configuration of a speaker recognition device according to Variation 1 of an embodiment of the present disclosure.

FIG. 7 is an exemplary block diagram of a concrete configuration of speaker recognition device 11A according to Variation 1 of the present embodiment. The structural components that are analogous to those in FIG. 3 are assigned with the same reference numbers, and will not be described in detail here.

As shown in FIG. 7, speaker recognition device 11A includes feature calculator 12A, similarity calculator 13A, combination unit 14, and determiner 15. Note that speaker recognition device 11A may further include storage 16 as an optional structural component. Speaker recognition device 11A shown in FIG. 7 is different from speaker recognition device 11 according to the foregoing embodiment in the configurations of feature calculator 12A and similarity calculator 13A.

[Feature Calculator 12A]

Feature calculator 12A, using two models that have been trained with different pieces of data, transforms the physical quantity of the uttered voice into two or more speaker-specific features, thereby calculating two or more acoustic features. Among the two or more acoustic features, at least two acoustic features calculated by use of at least two DNN models trained with different pieces of data have different properties.

As shown in FIG. 7, feature calculator 12A according to the present variation includes first feature calculator 121A and second feature calculator 122A. Feature calculator 12A uses first model 1211 of a DNN and second model 1221 of the DNN to transform the physical quantity of the uttered voice inputted from voice obtainer 10 into two speaker-specific features, thereby calculating two acoustic features. The following describes such two acoustic features as a first acoustic feature and a second acoustic feature.

<First Feature Calculator 121A>

First feature calculator 121A, using first model 1211 of the DNN, applies non-linear transformation on the physical quantity of the uttered voice inputted from voice obtainer 10 to obtain a speaker-specific feature, thereby calculating the first acoustic feature. More specifically, first feature calculator 121A uses first model 1211 of the DNN to calculate the first acoustic feature, which is a feature unique to a speaker known as an x-Vector, from the physical quantity of the uttered voice.

<Second Feature Calculator 122A>

Second feature calculator 122A, using second model 1221 that is second model 1221 of the DNN different in properties from first model 1211, applies non-linear transformation on the physical quantity of the uttered voice inputted from voice obtainer 10 to obtain a speaker-specific feature, thereby calculating the second acoustic feature. More specifically, second feature calculator 122A uses second model 1221 of the DNN to calculate the second acoustic feature, which is a feature unique to a speaker known as an x-Vector, from the physical quantity of the uttered voice.

Here, first model 1211 and second model 1221 are DNN models, as described above, that have been trained with different pieces of data. This will be described with reference to FIG. 8.

Figure 8:
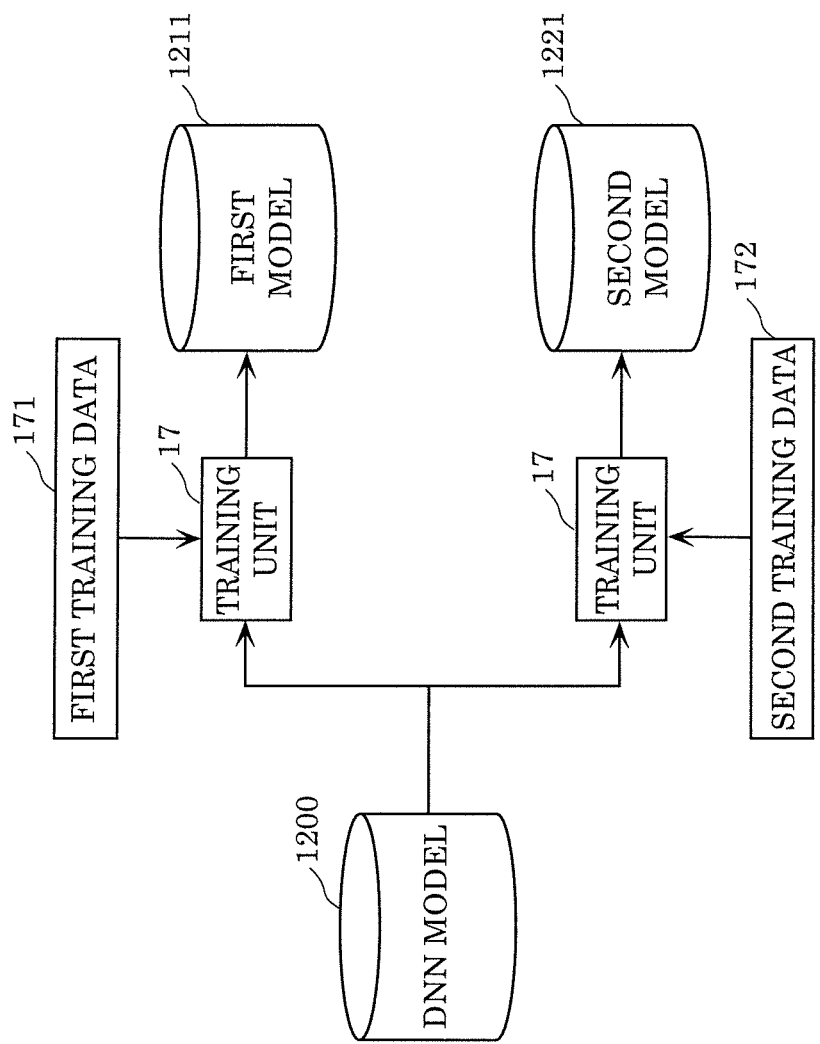
FIG. 8 is a diagram illustrating that a first model and a second model shown in FIG. 7 are trained with different pieces of data.

FIG. 8 is a diagram illustrating that first model 1211 and second model 1221 shown in FIG. 7 are trained with different pieces of data.

DNN model 1200 is a model of a DNN including a feature extraction unit and an identification unit and including no trained parameters, etc. DNN model 1200 is trained by training unit 17 such as a computer, using first training data 171 that includes voices of a target speaker for recognition under a noise environment at or higher than a threshold level. DNN model 1200 having undergone such training becomes first model 1211. Stated differently, first model 1211 is a model that has been trained with the first training data that includes voices of the target speaker for recognition under a noise environment at or higher than the threshold level. Consequently, first model 1211 becomes a DNN model capable of accurately identifying an uttered voice even in a noisy environment.

DNN model 1200 is also trained by training unit 17, using second training data 172 that includes voices of the target speaker for recognition under a noise environment below the threshold level. DNN model 1200 having undergone such training becomes second model 1221. Stated differently, second model 1221 is a model that has been trained with the second training data that includes voices of the target speaker for recognition under a noise environment below the threshold level. Consequently, second model 1221 becomes a DNN model capable of accurately identifying an uttered voice in an environment with little noise.

As described above, first model 1211 and second model 1221 according to the present variation are DNN models that have been trained with different pieces of training data and thus have different properties. For this reason, the first acoustic feature and the second acoustic feature to be calculated also have different properties.

[Similarity Calculator 13A]

Similarity calculator 13A calculates the similarity between each of one or more speaker-specific features of the target speaker for recognition and each of two or more acoustic features calculated by feature calculator 12. The present variation describes the case in which two or more similarities are calculated by the same calculation method, but at least two similarities among the two or more similarities may be calculated by different calculation methods.

As shown in FIG. 7, similarity calculator 13A according to the present variation includes first similarity calculator 131A and second similarity calculator 132A.

<First Similarity Calculator 131A>

First similarity calculator 131A calculates the similarity between the first acoustic feature calculated by first feature calculator 121A and speaker-specific feature 162 of the target speaker for recognition stored in storage 16. Also in an example shown in FIG. 7, speaker-specific feature 162 is the speaker-specific feature of Ms. A being the target speaker for recognition. First similarity calculator 131A according to the present variation calculates, as the first similarity, a cosine distance representing the inter-vector angle between the first acoustic feature and speaker-specific feature 162.

<Second Similarity Calculator 132A>

Second similarity calculator 132A calculates the similarity between the second acoustic feature calculated by second feature calculator 122A and speaker-specific feature 162 of the target speaker for recognition stored in storage 16. Second similarity calculator 132A according to the present variation calculates, as the second similarity, a cosine distance representing the inter-vector angle between the second acoustic feature and speaker-specific feature 162.

[Effect, Etc.]

As described above, the present variation achieves speaker recognition device 11A that enhances the accuracy of speaker recognition even in an environment with noise intrusion. More specifically, speaker recognition device 11A according to the present variation, as described above, calculates speaker-specific features from the physical quantity of the uttered voice by use of at least two models having been trained with different pieces of training data, thereby obtaining at least two acoustic features having different properties. Speaker recognition device 11A according to the present variation then combines two or more similarities between the current speaker and the registered speaker calculated from at least two acoustic features having different properties to determine whether the current speaker matches the registered speaker. This configuration enables a more accurate determination on whether the current speaker matches the registered speaker, by use of a combined value obtained by combining similarities, even when acoustic features cannot be correctly calculated due to noise intrusion.

As described above, speaker recognition device 11A according to the present variation enhances the accuracy of speaker recognition even in an environment with noise intrusion.

Note that the present variation has described the case in which features unique to a speaker (speaker-specific features) known as x-Vectors are calculated from the physical quantity of an uttered voice by use of two DNN models trained with different pieces of training data, but the present disclosure is not limited to this example. The same effect is achieved when features unique to a speaker (speaker-specific features) known as i-Vectors are calculated from the physical quantity of an uttered voice by use of two statistical models that have been trained with different pieces of training data.

Variation 2

The foregoing embodiment and Variation 1 have described the case of combining two or more similarities between the current speaker and the registered speaker calculated from at least two acoustic features having different properties, but the present disclosure is not limited to this example. The achievement of speaker recognition with enhanced accuracy is also possible, even in an environment with noise intrusion, by combining two or more similarities between the current speaker and the registered speaker having different properties, from at least two acoustic features having the same property (properties not mutually different). The following describes such case as Variation 2, focusing on the differences from the foregoing embodiment and Variation 1.

[Speaker Recognition Device 11B]

Figure 9:
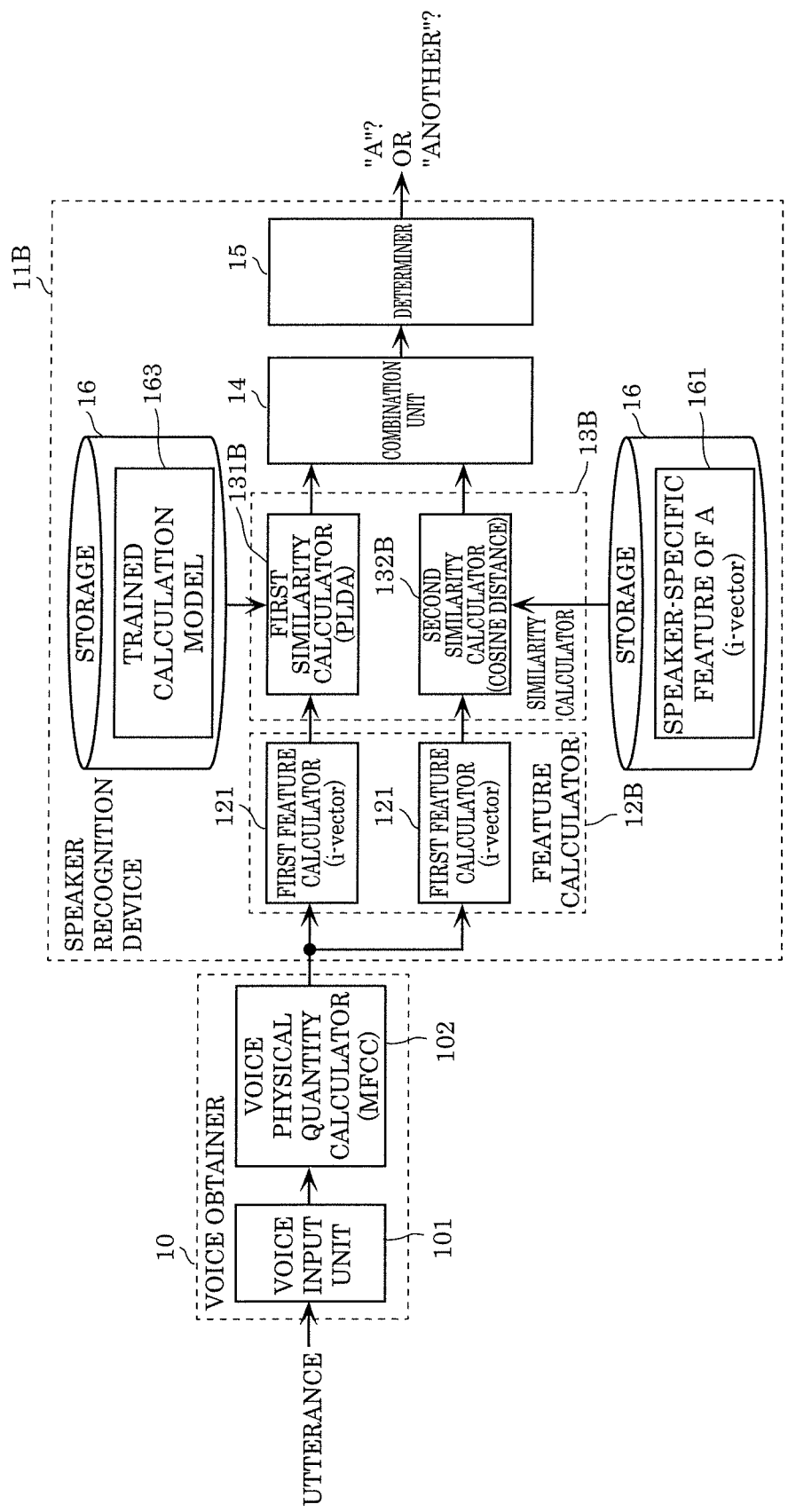
FIG. 9 is an exemplary block diagram of a concrete configuration of a speaker recognition device according to Variation 2 of an embodiment of the present disclosure.

FIG. 9 is an exemplary block diagram of a concrete configuration of speaker recognition device 11B according to Variation 2 of the present embodiment. The structural components that are analogous to those in FIG. 3 are assigned with the same reference numbers, and will not be described in detail here.

As shown in FIG. 9, speaker recognition device 11B includes feature calculator 12B, similarity calculator 13B, combination unit 14, and determiner 15. Note that speaker recognition device 11B may further include storage 16 as an optional structural component. Speaker recognition device 11B shown in FIG. 9 is different from speaker recognition device 11 according to the foregoing embodiment in the configurations of feature calculator 12B and similarity calculator 13B. Also, storage 16 according to the present variation further stores trained calculation model 163 for use by similarity calculator 13B.

[Feature Calculator 12B]

Feature calculator 12B transforms the physical quantity of an uttered voice into two or more speaker-specific features, thereby calculating two or more acoustic features.

As shown in FIG. 9, feature calculator 12B according to the present variation includes two first feature calculators 121 to transform the physical quantity of the uttered voice inputted from voice obtainer 10 into two speaker-specific features, thereby calculating two acoustic features. Such two acoustic features may be referred to as a first acoustic feature and a second acoustic feature, but the first acoustic feature and the second acoustic feature are the same, and thus will be referred to as two first acoustic features in the following description.

[Similarity Calculator 13B]

Similarity calculator 13B calculates the similarity between each of one or more speaker-specific features of the target speaker for recognition and each of two or more acoustic features calculated by feature calculator 12. The following describes the case where at least two similarities among the two or more similarities have different properties.

As shown in FIG. 9, similarity calculator 13B according to the present variation includes first similarity calculator 131B and second similarity calculator 132B.

<First Similarity Calculator 131B>

First similarity calculator 131B uses trained calculation model 163 stored in storage 16 to calculate the first similarity that is the similarity between the first acoustic feature calculated by first feature calculator 121 and the speaker-specific feature of Ms. A being the target speaker for recognition. More specifically, first similarity calculator 131B uses a trained calculation model stored in storage 16 to calculate, by probabilistic linear discriminant analysis (PLDA), the first similarity from the first acoustic feature calculated by first feature calculator 121.

Here, the trained calculation model is a calculation model that has been trained with a speaker's feature that includes how the target speaker for recognition speaks and a calculation model that is used to calculate a speaker-specific feature among one or more speaker-specific features. A trained calculation model is a model that is obtained by previously trained with a distribution representing how the feature can vary, even when an utterance of the same speaker is concerned, depending on the way such speaker speaks or a voice pickup condition such as a surrounding environment of the speaker. Through this training, the trained calculation model can be a model with a higher accuracy as a voice pickup condition under which an uttered voice of the speaker is inputted to voice obtainer 10 is closer to the voice pickup condition used at the time of the previous training.

<Second Similarity Calculator 132B>

Second similarity calculator 132B calculates the similarity between the first acoustic feature calculated by first feature calculator 121 and the speaker-specific feature 161 of the target speaker for recognition stored in storage 16. The present variation calculates, as the second similarity, a cosine distance that represents the inter-vector angle between the first acoustic feature and speaker-specific feature 161.

Second similarity calculator 132B requires no trained speaker model for similarity calculation. For this reason, the second similarity is less dependent on a voice pickup condition under which an uttered voice of a speaker is inputted to voice obtainer 10 than the first similarity. As described above, the first acoustic feature and the second acoustic feature have different properties.

[Effect, Etc.]

As described above, the present variation achieves speaker recognition device 11B that enhances the accuracy of speaker recognition even in an environment with noise intrusion. More specifically, speaker recognition device 11B according to the present variation, as described above, combines two or more similarities, having different properties, between the current speaker and the registered speaker, and determines whether the current speaker matches the registered speaker. The use of a combined value obtained by combining similarities having different properties enables a more accurate determination on whether the current speaker matches the registered speaker, even when acoustic features cannot be correctly calculated due to noise intrusion.

As described above, speaker recognition device 11B according to the present variation enhances the accuracy of speaker recognition even in an environment with noise intrusion.

Example

The foregoing embodiment and variations have described the case of calculating and combining two similarities from two acoustic features as an example of two or more acoustic features and two or more similarities, but the present disclosure is not limited to this. The present example describes the case of calculating and combining three similarities from three acoustic features as an example of two or more acoustic features and two or more similarities. The following focuses on the differences from the foregoing embodiment and variations.

[Speaker Recognition Device 11C]

Figure 10:
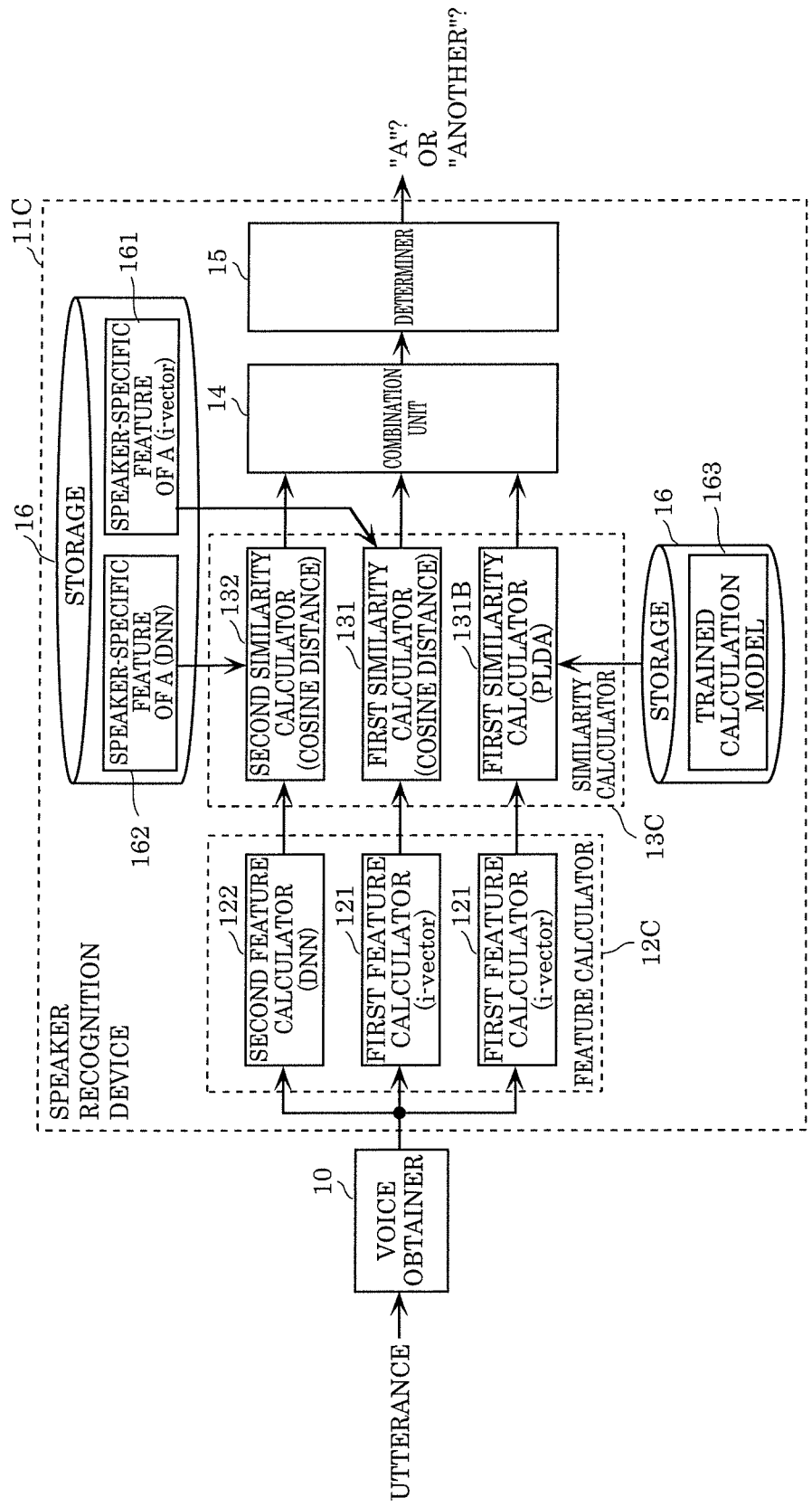
FIG. 10 is an exemplary block diagram of a concrete configuration of a speaker recognition device according to an example of an embodiment of the present disclosure.

FIG. 10 is an exemplary block diagram of a concrete configuration of speaker recognition device 11C according to an example of the present embodiment. The structural components that are analogous to those in FIG. 3, FIG. 7, and FIG. 9 are assigned with the same reference numbers, and will not be described in detail here.

As shown in FIG. 10, speaker recognition device 11C includes feature calculator 12C, similarity calculator 13C, combination unit 14, and determiner 15. Note that speaker recognition device 11C may further include storage 16 as an optional structural component. Speaker recognition device 11C shown in FIG. 10 is different from speaker recognition device 11 and others according to the foregoing embodiment and variations in the configurations of feature calculator 12C and similarity calculator 13C. Also, storage 16 according to the present example further stores trained calculation model 163 for use by similarity calculator 13C.

[Feature Calculator 12C]

Feature calculator 12C transforms the physical quantity of an uttered voice into three or more speaker-specific features, thereby calculating three or more acoustic features.

As shown in FIG. 10, feature calculator 12C according to the present example includes two first feature calculators 121 and a single second feature calculator 122 to transform the physical quantity of the uttered voice inputted from voice obtainer 10 into three speaker-specific features, thereby calculating three acoustic features. Such three acoustic features may be referred to as a first acoustic feature, a second acoustic feature, and a third acoustic feature, but will be referred to as two first acoustic features (i-Vectors) and a single second acoustic feature (x-Vector) in the following description in accordance with the foregoing embodiment. Note that calculation methods for two first acoustic features (i-Vectors) and for a single second acoustic feature (x-Vector) are different, and thus these acoustic feature have different properties.

[Similarity Calculator 13C]

Similarity calculator 13C calculates the similarity between each of a plurality of speaker-specific features of the target speaker for recognition and each of the three acoustic features calculated by feature calculator 12C.

As shown in FIG. 10, similarity calculator 13C according to the present example includes first similarity calculator 131, first similarity calculator 131B, and second similarity calculator 132. Similarity calculator 13C calculates, from three acoustic features calculated by feature calculator 12C, three similarities with respect to the speaker-specific features of the target speaker for recognition stored in storage 16. Such three similarities may be referred to as a first similarity, a second similarity, and a third similarity, but will be referred to as a first similarity (cosine distance), a second similarity (cosine distance), and a first similarity (PLDA) in the following description in accordance with the foregoing embodiment. Note that calculation methods for the first similarity (cosine distance) and the second similarity (cosine distance), and for the first similarity (PLDA) are different, and thus these similarities have different properties.

[Combination Unit 14]

Combination unit 14 combines two or more similarities calculated by similarity calculator 13. Note that combination unit 14 according to the present example first normalizes the first similarity (cosine distance), the second similarity (cosine distance), and the first similarity (PLDA) so that the mean value is zero and the variance is one to calculate a weighted sum, thereby combining three similarities.

FIG. 11A through FIG. 11C are diagrams showing exemplary similarities calculated by similarity calculator 13C shown in FIG. 10. FIG. 11A shows exemplary second similarities (cosine distances) in a value range from −1 to 1 calculated by second similarity calculator 132 shown in FIG. 10. FIG. 11B shows exemplary first similarities (cosine distances) in a value range from −1 to 1 calculated by first similarity calculator 131 shown in FIG. 10. FIG. 11C shows exemplary first similarities (PLDAs) calculated by first similarity calculator 131B shown in FIG. 10. Note that "TEST UTTERANCE" shown in FIG. 11A through FIG. 11C represents voice files of 13 individual utterances obtained by voice obtainer 10. "TARGET OR NONTARGET" shown in FIG. 11A through FIG. 11C indicates whether each speaker who gave a test utterance was the target speaker for recognition.

FIG. 12 is a diagram showing exemplary combined values calculated by combination unit 14 shown in FIG. 10. Each of the combined values shown in FIG. 12 is obtained by calculating a weighted sum by normalizing the corresponding first similarity (cosine distance) shown in FIG. 11A, the corresponding second similarity (cosine distance) shown in FIG. 11B, and the corresponding first similarity (PLDA) shown in FIG. 11C so that the mean value is zero and the variance is one.

FIG. 12 shows that the use of a combined value and a threshold that is set, for example, at 1.7, enables to determine whether each test speaker is the target speaker for recognition.

Stated differently, even when at least two acoustic features among the three acoustic features have different properties and at least two similarities among the three similarities have different properties, a combined value can be obtained simply by normalizing the three similarities so that the mean value is zero and the variance is one to calculate a weighted sum. This configuration enables to determine whether the speaker of each test utterance is the target speaker for recognition by use of such combined value. As described above, the obtainment of a combined value is possible from two similarities, etc. having different properties, i.e., the combined value can be obtained that can be used to determine whether the speaker of each test utterance is the target speaker for recognition.

The speaker recognition device according to an embodiment, variations, and so forth according to the present disclosure have been described above, but the present disclosure is not limited to such embodiment and variation, etc.

Each of the processing units included in the speaker recognition device according to the foregoing embodiment, variations, etc. may be implemented as a large-scale integration (LSI), which is typically an integrated circuit. These processing units may take the form of individual chips, or one or more or all of the processing units may be encapsulated into a single chip.

Such integrated circuit is not limited to LSI. Each of the processing units thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

The present disclosure may also be implemented as a speaker recognition method for use by the speaker recognition device.

Also, in the foregoing embodiment and variations, each of the structural components may be implemented as dedicated hardware or may be implemented by executing a software program suited to such structural components. Alternatively, the structural components may be implemented by a program executor such as a CPU and a processor reading out and executing the software program recorded in a recording medium such as a hard disk and a semiconductor memory.

Also, the division of the functional blocks in the block diagrams is an example, and thus a plurality of functional blocks may be implemented as a single functional block, a single functional block may be divided into a plurality of blocks, or one or more functions may be moved to another functional block. Also, the functions of a plurality of functional blocks having similar functions may be processed by single hardware or software in parallel or in a time-shared manner.

The processing order of the steps in each flowchart is used to specifically describe the present disclosure, and thus such steps may be executed in a different order. Also, one or more of such steps may be simultaneously (parallelly) executed with another step.

The speaker recognition device according to one or more aspects of the present disclosure has been described on the basis of the embodiment, variations, etc., but the present disclosure is not limited to such embodiment, variations, etc.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable for use in a speaker recognition device, a speaker recognition method, and a recording medium. The present disclosure finds its application in a speaker recognition device, a speaker recognition method, and a recording medium used, for example, in an entry and exit control system, a security system, an AI speaker, and a call center that require the function of recognizing a speaker from an uttered voice.

What is claimed is:

1. A speaker recognition device, comprising:
   a feature calculator that calculates two or more acoustic features of a voice of an utterance obtained;
   a similarity calculator that calculates two or more similarities, each being a similarity between one of one or more speaker-specific features of a target speaker for recognition and one of the two or more acoustic features calculated by the feature calculator;
   a combination unit that combines the two or more similarities calculated by the similarity calculator to obtain a combined value; and
   a determiner that determines whether a speaker of the utterance is the target speaker for recognition based on the combined value obtained by the combination unit,
   wherein (i) at least two of the two or more acoustic features have different properties, (ii) at least two of the two or more similarities have different properties, or (iii) at least two of the two or more acoustic features have different properties and at least two of the two or more similarities have different properties,
   the at least two of the two or more similarities are a first similarity and a second similarity having different properties,
   the first similarity is calculated from a first acoustic feature by probabilistic linear discriminant analysis by use of a trained calculation model that has been trained with a feature of the target speaker including how the target speaker speaks and that is used to calculate a first speaker-specific feature that is one of the one or more speaker-specific features, the first acoustic feature being one of the two or more acoustic features calculated by the feature calculator, and
   the second similarity is calculated as a cosine distance between a second speaker-specific feature that is one of the one or more speaker-specific features and a second acoustic feature that is one of the two or more acoustic features calculated by the feature calculator.

2. The speaker recognition device according to claim 1,
   wherein the first acoustic feature and the second acoustic feature have different properties,
   the first acoustic feature is calculated by the feature calculator by applying linear transformation on a physical quantity of the voice of the utterance by use of an i-Vector, and
   the second acoustic feature is calculated by the feature calculator by applying non-linear transformation on the physical quantity of the voice by use of a deep neural network (DNN).

3. The speaker recognition device according to claim 1,
   wherein the first acoustic feature and the second acoustic feature have different properties,
   the first acoustic feature is calculated by the feature calculator by applying non-linear transformation by use of a first model of a DNN,
   the second acoustic feature is calculated by the feature calculator by applying non-linear transformation by use of a second model of the DNN that is different in property from the first model,
   the first model is a model trained with first training data that includes a voice of the target speaker for recognition in a noise environment at or higher than a threshold level, and
   the second model is a model trained with second training data that includes a voice of the target speaker for recognition in a noise environment below the threshold level.

4. The speaker recognition device according to claim 1,
   wherein the first acoustic feature and the second acoustic feature are identical.

5. The speaker recognition device according to claim 1,
   wherein the combination unit combines the two or more similarities by adding scores representing the two or more similarities calculated by the similarity calculator.

6. The speaker recognition device according to claim 1,
   wherein the combination unit combines the two or more similarities calculated by the similarity calculator by normalizing the two or more similarities to cause a mean value to be zero and a variance to be one, and adding the two or more similarities having been normalized.

7. The speaker recognition device according to claim 1,
   wherein the combination unit combines the two or more similarities calculated by the similarity calculator by normalizing the two or more similarities to cause a mean value to be zero and a variance to be one, and calculating a weighted sum of the two or more similarities having been normalized.

8. The speaker recognition device according to claim 7,
   wherein the combination unit calculates the weighted sum by multiplying by a greater coefficient as a temporal length of the utterance obtained is longer.

9. A speaker recognition method performed by a computer, the speaker recognition method comprising:
   calculating two or more acoustic features of a voice of an utterance obtained;
   calculating two or more similarities, each being a similarity between one of one or more speaker-specific features of a target speaker for recognition and one of the two or more acoustic features calculated in the calculating of the two or more acoustic features;
   combining the two or more similarities calculated in the calculating of the two or more similarities to obtain a combined value; and
   determining whether a speaker of the utterance is the target speaker for recognition based on the combined value obtained in the combining,
   wherein (i) at least two of the two or more acoustic features have different properties, (ii) at least two of the two or more similarities have different properties, or (iii) at least two of the two or more acoustic features have different properties and at least two of the two or more similarities have different properties,
   the at least two of the two or more similarities are a first similarity and a second similarity having different properties,
   the first similarity is calculated from a first acoustic feature by probabilistic linear discriminant analysis by use of a trained calculation model that has been trained with a feature of the target speaker including how the target speaker speaks and that is used to calculate a first speaker-specific feature that is one of the one or more speaker-specific features, the first acoustic feature being one of the two or more acoustic features calculated in the calculating of the two or more acoustic features, and the second similarity is calculated as a cosine distance between a second speaker-specific feature that is one of the one or more speaker-specific features and a second acoustic feature that is one of the two or more acoustic features calculated in the calculating of the two or more acoustic features.

10. A non-transitory computer-readable recording medium for use in a computer, the recording medium having a computer program recorded thereon for causing the computer to execute:

calculating two or more acoustic features of a voice of an utterance obtained;

calculating two or more similarities, each being a similarity between one of one or more speaker-specific features of a target speaker for recognition and one of the two or more acoustic features calculated in the calculating of the two or more acoustic features;

combining the two or more similarities calculated in the calculating of the two or more similarities to obtain a combined value; and determining whether a speaker of the utterance is the target speaker for recognition based on the combined value obtained in the combining, wherein (i) at least two of the two or more acoustic features have different properties, (ii) at least two of the two or more similarities have different properties, or (iii) at least two of the two or more acoustic features have different properties and at least two of the two or more similarities have different properties, the at least two of the two or more similarities are a first similarity and a second similarity having different properties, the first similarity is calculated from a first acoustic feature by probabilistic linear discriminant analysis by use of a trained calculation model that has been trained with a feature of the target speaker including how the target speaker speaks and that is used to calculate a first speaker-specific feature that is one of the one or more speaker-specific features, the first acoustic feature being one of the two or more acoustic features calculated in the calculating of the two or more acoustic features, and the second similarity is calculated as a cosine distance between a second speaker-specific feature that is one of the one or more speaker-specific features and a second acoustic feature that is one of the two or more acoustic features calculated in the calculating of the two or more acoustic features.

* * * * *